US012145422B1

(12) United States Patent
Otten et al.

(10) Patent No.: US 12,145,422 B1
(45) Date of Patent: Nov. 19, 2024

(54) STORAGE SYSTEMS AND METHODS HAVING CONTAINER-BASED ENVIRONMENT CONTROL

(71) Applicant: Amazon Technologies, Inc., Seattle, WA (US)

(72) Inventors: James Stewart Otten, Seattle, WA (US); Kaushal Bharatkumar Mehta, Seattle, WA (US); Dhavalkumar Shah, Nashville, TN (US)

(73) Assignee: Amazon Technologies, Inc., Seattle, WA (US)

( * ) Notice: Subject to any disclaimer, the term of this patent is extended or adjusted under 35 U.S.C. 154(b) by 409 days.

(21) Appl. No.: 17/532,338

(22) Filed: Nov. 22, 2021

(51) Int. Cl.
| | | |
|---|---|---|
| *B60H 1/00* | (2006.01) | |
| *B65G 1/137* | (2006.01) | |
| *G05B 19/4155* | (2006.01) | |
| *G06Q 10/0832* | (2023.01) | |

(52) U.S. Cl.
CPC ..... *B60H 1/00842* (2013.01); *B60H 1/00792* (2013.01); *B65G 1/137* (2013.01); *G05B 19/4155* (2013.01); *G05B 2219/50333* (2013.01); *G06Q 10/0832* (2013.01)

(58) Field of Classification Search
CPC ............ B60H 1/00842; B60H 1/00792; H65G 1/137; G05B 19/4155; G05B 2219/50333; G06Q 10/0812
USPC ......................................................... 700/300
See application file for complete search history.

(56) References Cited

U.S. PATENT DOCUMENTS

| | | | |
|---|---|---|---|
| 2017/0215620 A1* | 8/2017 | Dade | ....................... F25D 17/00 |
| 2021/0300664 A1* | 9/2021 | Fosnight | ................. F25D 25/04 |
| 2022/0019965 A1* | 1/2022 | Choi | .................. G06Q 10/0833 |
| 2022/0194699 A1* | 6/2022 | Looker | .................. B65G 1/045 |
| 2023/0028034 A1* | 1/2023 | Gravelle | .............. G06Q 10/087 |
| 2023/0076551 A1* | 3/2023 | Lee | ..................... H01L 21/6773 |

(Continued)

FOREIGN PATENT DOCUMENTS

WO     2020210558 A1     10/2020

OTHER PUBLICATIONS

Cavalieri, Lincoln, "#engineering #microfulfillment #lastmilelogistics #retail #retailtech," Linkedin.com, Nov. 2, 2021, 00:15, [accessed Nov. 8, 2021] URL: https://www.linkedin.com/feed/update/um%3Ali%3Aactivity%3A6861306459511132160/.

(Continued)

*Primary Examiner* — Md Azad
(74) *Attorney, Agent, or Firm* — Athorus, PLLC

(57) ABSTRACT

Systems and methods to provide environment control to individual containers of a storage system may include a distribution network including one or more sources, distribution lines, valves, sensors, and storage positions. The distribution network may be operated to provide air flow having desired environment attributes to individual storage positions that include supply and/or return lines and associated valves. Insulated containers having input and/or output lines and associated valves may couple to the distribution network upon placement at the storage positions, thereby providing air flow with desired environment attributes to individual insulated containers and associated items. Further, non-insulated containers may also be placed at the storage positions of the storage system without connecting to the distribution network.

20 Claims, 8 Drawing Sheets

(56) References Cited

U.S. PATENT DOCUMENTS

2023/0271785 A1* 8/2023 Gravelle .............. G06Q 10/087
                                                    700/216

OTHER PUBLICATIONS

Urbx Logistics, "100% Fresh (totes)," YouTube.com, Urbx Logistics, Jul. 15, 2021, 0:33, [accessed Nov. 8, 2021] URL: https://www.youtube.com/watch?v=3ENoiE79IAc.

* cited by examiner

STORAGE SYSTEMS AND METHODS HAVING CONTAINER-BASED ENVIRONMENT CONTROL

BACKGROUND

Many companies may store, package, and ship items and/or groups of items from material handling facilities. For example, many companies may store items in a material handling facility and ship items to various destinations (e.g., customers, stores) from the material handling facility. In addition, in order to control storage temperatures and/or maintain cold chain of some items, cold chambers may be constructed around existing storage systems, such as automated storage and retrieval systems. Such cold chambers are expensive, inflexible, and inefficient, and require machinery or equipment to operate at cold temperatures and/or while traversing between cold and ambient temperatures. Accordingly, there is a need for automated systems and methods to facilitate environment control of items in storage systems that provide greater flexibility, efficiency, and reliability.

DETAILED DESCRIPTION

Figure 1:
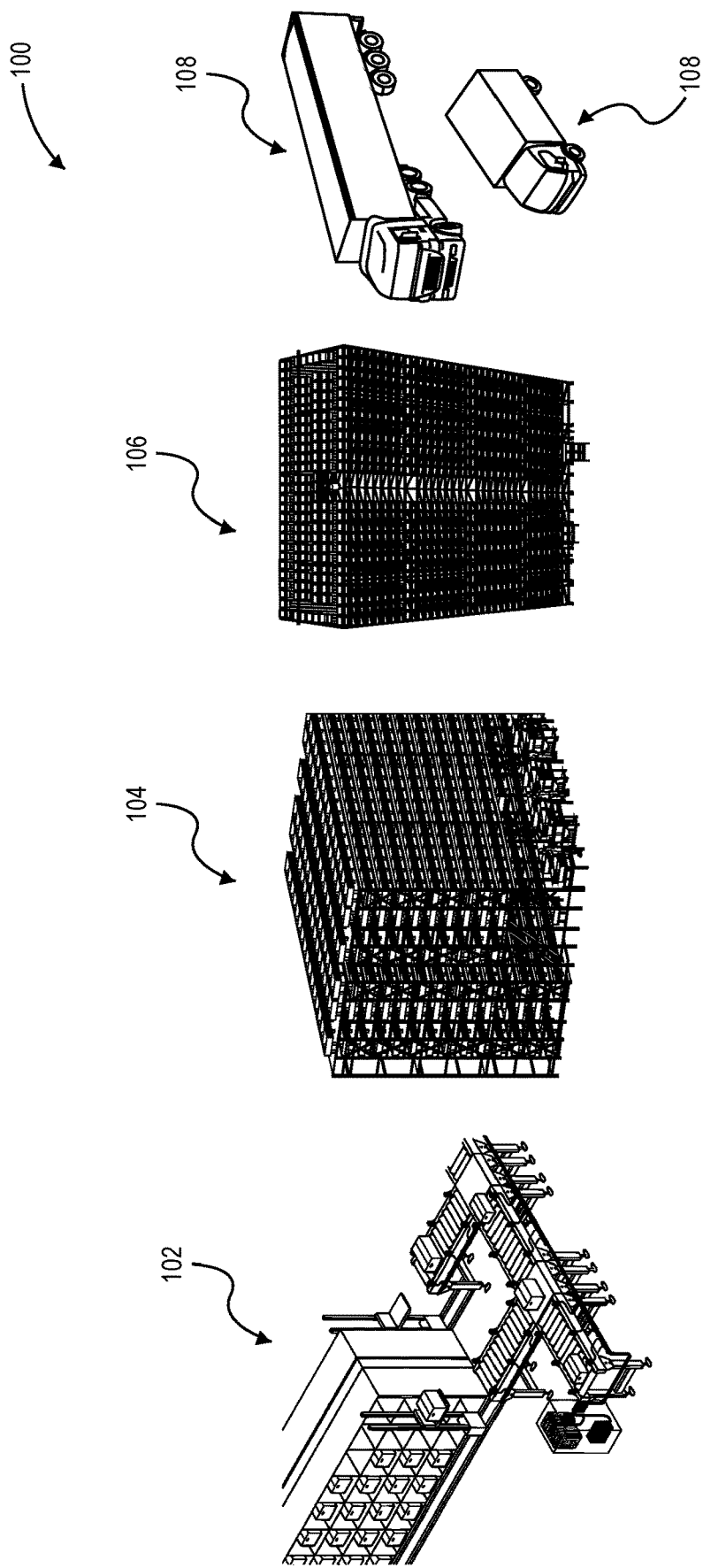
FIG. 1 are schematic diagrams of example storage systems that may incorporate container-based environment control systems and methods, in accordance with implementations of the present disclosure.

As is set forth in greater detail below, implementations of the present disclosure are directed to systems and methods for container-based environment control of items stored in a storage system or array. The systems and methods may include a storage system or array, a distribution network, one or more insulated containers configured to couple to the distribution network, one or more non-insulated containers, and/or one or more agents configured to position individual containers within the storage system or array, as well as to couple and decouple insulated containers to and from the distribution network.

In example embodiments, the storage system or array may comprise various types of storage systems, including automated storage and retrieval systems, multi-shuttle automated storage and retrieval systems, container- or tote-based automated storage and retrieval systems, storage racks or shelves, or other types of storage systems or arrays. In addition, the storage system or array may comprise a plurality of storage positions that are configured to receive individual containers or totes.

In example embodiments, the distribution network may comprise a plurality of sources, a plurality of distribution lines, a plurality of valves, and/or a plurality of sensors. The plurality of sources may provide air flow having various environment attributes, e.g., various temperatures, humidities, pressures, air flow rates, and/or other attributes. The plurality of distribution lines may couple the sources with at least some of the plurality of storage positions of the storage system or array. The plurality of valves may enable control over air flow communication and/or environment attributes between the sources and portions of the plurality of distribution lines and/or individual storage positions. Further, the plurality of sensors may detect data associated with environment attributes at portions of the plurality of distribution lines and/or individual storage positions. At individual storage positions, the distribution network may also comprise supply lines, associated supply valves, return lines, and/or associated return valves configured to couple with individual containers.

The one or more insulated containers may comprise totes, crates, boxes, bags, pouches, or other types of containers that may be positioned at respective storage positions of the storage system or array. The insulated containers may also comprise input lines, associated input valves, output lines, and/or associated output valves that are configured to couple with the supply lines, associated supply valves, return lines, and/or associated return valves at individual storage positions. The supply valves and input valves may couple together and form double shut-off disconnect valves, and the return valves and output valves may also couple together and form double shut-off disconnect valves.

The one or more non-insulated containers may also comprise totes, crates, boxes, bags, pouches, or other types of containers that may be positioned at respective storage positions of the storage system or array. The non-insulated containers may not comprise input lines, associated input valves, output lines, and/or associated output valves, such that the non-insulated containers may not couple with the supply lines, associated supply valves, return lines, and/or associated return valves at individual storage positions.

The one or more automated agents may comprise automated shuttles and/or elevators, robotic drive units, robotic arms, other robotic or automated equipment, and/or human agents or associates that are configured to position and remove individual containers relative to various storage positions. Responsive to placement of an insulated container at a storage position, the supply line and input line may substantially automatically couple to each other, and the return line and output line may also substantially automatically couple to each other. Further, the supply valve and the input valve may substantially automatically open to allow air flow communication between the distribution line and the container, and the return valve and the output valve may also substantially automatically open to allow air flow communication between the distribution line and the container. Responsive to removal of the insulated container from the storage position, the supply line and input line may substantially automatically decouple from each other, and the return line and output line may also substantially automatically decouple from each other. Further, the supply valve and the input valve may substantially automatically close to prevent air flow communication relative to either the distribution line or the container, and the return valve and the output valve may also substantially automatically close to prevent air flow communication relative to either the distribution line or the container.

Responsive to placement of a non-insulated container at a storage position, the supply and return lines may not couple to portions of the container, and the supply and return valves may remain closed to prevent air flow communication relative to the distribution line. Responsive to removal of the non-insulated container from the storage position, the supply and return lines may remain uncoupled from portions of the container, and the supply and return valves may also remain closed to prevent air flow communication relative to the distribution line.

Using the container-based environment control systems and methods described herein, containers having one or more items may be provided with environment control on an individual basis, such that different containers may have different temperatures, humidities, pressures, air flow rates, or other environment attributes from each other and at various points in time. In addition, the environment control systems described herein may be substantially closed systems that reduce a total volume subject to environment control, enable more precise environment control, and also minimize losses and inefficiencies associated with environment control. Further, the container-based environment control systems and methods described herein may enable automated machinery, robots, and equipment, e.g., shuttles associated with automated storage and retrieval systems, robotic drive units or robotic arms that move or transfer containers, and/or other machinery or equipment, to operate at substantially ambient temperatures, and/or without traversing between cold and ambient temperatures during various operations. Thus, the container-based environment control systems and methods described herein may enable safe, flexible, efficient, and reliable storage of items within containers having environment control in a storage system or array.

FIG. 1 are schematic diagrams 100 of example storage systems that may incorporate container-based environment control systems and methods, in accordance with implementations of the present disclosure.

As shown in FIG. 1, an automated storage and retrieval system 102, such as a multi-shuttle automated storage and retrieval system, may incorporate container-based environment control systems and methods as described herein. For example, the automated storage and retrieval system 102 may include one or more shuttles, one or more elevators or lifts, and/or a plurality of storage positions configured to receive individual containers having one or more items. The shuttles and/or elevators may cooperate to move and transfer containers into and out of storage positions.

In addition, as shown in FIG. 1, one or more container- or tote-based automated storage and retrieval systems 104, 106 may also incorporate container-based environment control systems and methods as described herein. For example, the container- or tote-based automated storage and retrieval systems 104, 106 may include one or more robotic drive units, one or more elevators or lifts, and/or a plurality of storage positions associated with blocks and/or floors of the storage system, in which the storage positions are configured to receive individual containers or totes having one or more items. The robotic drive units and/or elevators may cooperate to move and transfer containers or totes into and out of storage positions. Example container- or tote-based automated storage and retrieval systems are described in further detail in U.S. patent application Ser. No. 17/035,110, filed Sep. 28, 2020, and U.S. patent application Ser. No. 17/035, 114, filed Sep. 28, 2020, each of which is incorporated by reference herein in its entirety.

Further, as shown in FIG. 1, one or more trailers, freight containers, delivery trucks or vans, ground-based vehicles, aircraft or airplanes, ships or boats, and/or other types of vehicles 108 may also incorporate container-based environment control systems and methods as described herein. For example, the vehicles 108 may include storage systems or storage arrays having a plurality of storage positions, in which the storage positions are configured to receive individual containers or totes having one or more items. In some example embodiments, one or more shuttles, robotic drive units, and/or robotic arms may move and transfer containers or totes into and out of storage positions. In other example embodiments, the storage systems and arrays incorporated into vehicles 108 may be substantially manually operated by human agents or associates who may move and transfer containers or totes into and out of storage positions.

Furthermore, various other types of storage systems or arrays may incorporate container-based environment control systems and methods as described herein. For example, the storage system or array may comprise storage racks, shelves, and/or walls having a plurality of storage positions configured to receive individual containers having one or more items. One or more robotic arms and associated end effectors, or other types of robotic or automated machinery or equipment, may grasp, move, and transfer containers into and out of storage positions. In further example embodiments, one or more human agents or associates may also grasp, move, and transfer containers into and out of storage positions of a storage system or array.

Figure 2:
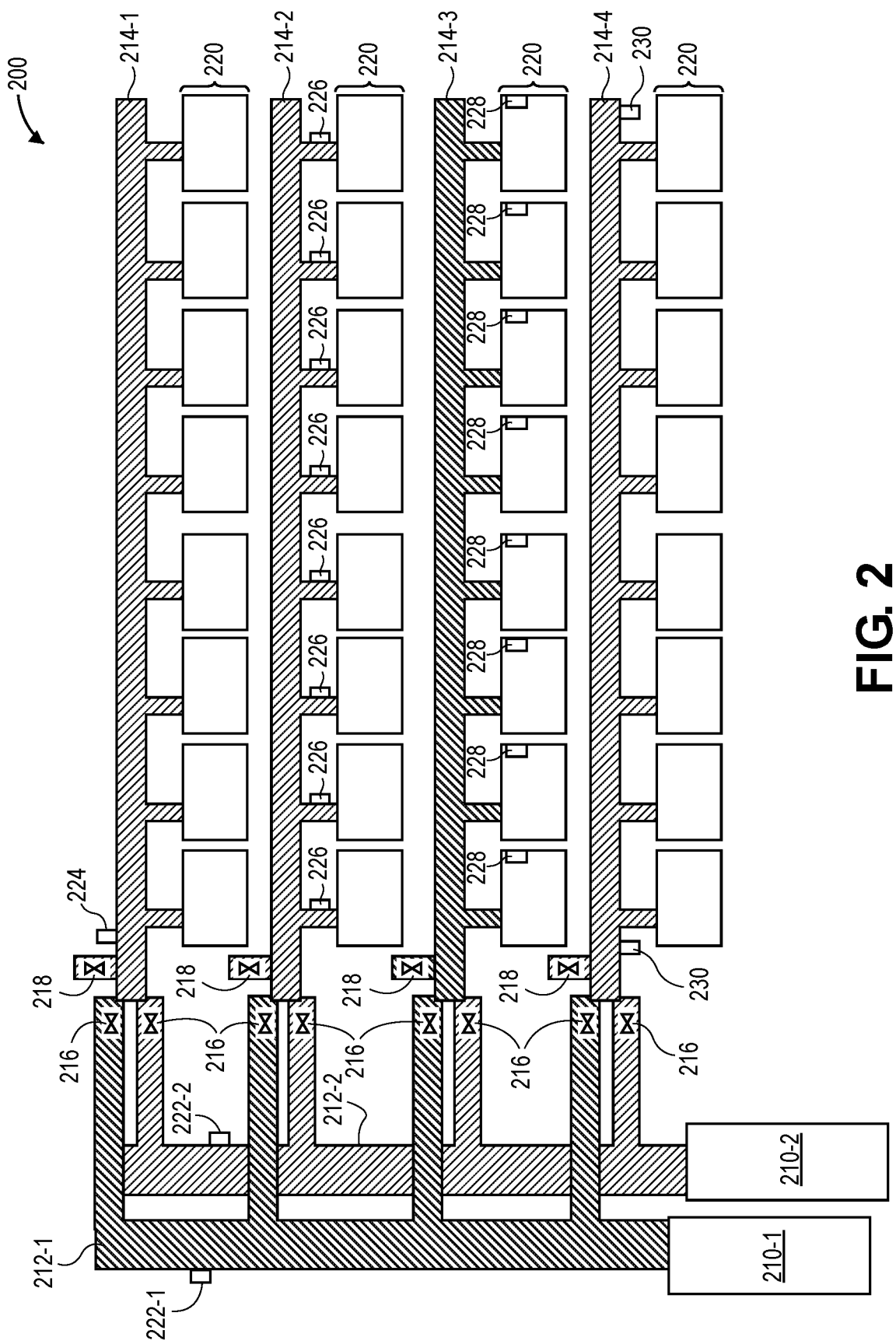
FIG. 2 is a schematic, overhead view diagram of portions of an example container-based environment control system and method, in accordance with implementations of the present disclosure.

FIG. 2 is a schematic, overhead view diagram 200 of portions of an example container-based environment control system and method, in accordance with implementations of the present disclosure.

As shown in FIG. 2, an example distribution network, e.g., an environment control distribution network and/or an air distribution network, may comprise one or more sources 210, a plurality of distribution lines, tubes, or pipes 212, 214, a plurality of valves 216, 218, a plurality of containers 220 positioned at storage positions of a storage system or array, and/or a plurality of sensors 222, 224, 226, 228, 230.

In example embodiments, the one or more sources 210 may comprise a frozen air source 210-1 and a chilled air source 210-2. For example, the frozen air source 210-1 may provide air flow at temperatures between approximately -10 degrees F. and approximately 0 degrees F., or in other temperature ranges. In addition, the chilled air source 210-2 may provide air flow at temperatures between approximately 25 degrees F. and approximately 55 degrees F., or in other temperature ranges. In addition, the one or more sources 210 may provide air flow at various levels of humidity, various air pressures, various air flow rates, and/or various other environment attributes. In some example embodiments, the one or more sources 210 may comprise evaporators, condensers, refrigerators, freezers, humidifiers, dehumidifiers, pumps, fans, blowers, and/or various other types of environment control equipment, machinery, or systems.

In example embodiments, the plurality of distribution lines, tubes, or pipes may comprise first or main distribution lines 212 and/or second or supplementary distribution lines 214. For example, the main distribution lines 212 may couple directly to one or more of the sources 210, and provide air flow having environment attributes as defined or generated by the sources 210. In the example embodiments of FIG. 2, the main distribution line 212-1 may be coupled to the frozen air source 210-1 to provide air flow at temperatures between approximately −10 degrees F. and approximately 0 degrees F. and/or with other environment attributes, and the main distribution line 212-2 may be coupled to the chilled air source 210-2 to provide air flow at temperatures between approximately 25 degrees F. and approximately 55 degrees F. and/or with other environment attributes.

In addition, the supplementary distribution lines 214 may couple to one or more of the main distribution lines 212, and provide air flow to one or more storage positions of a storage system or array. In the example embodiments of FIG. 2, a first supplementary distribution line 214-1 may couple to each of the main distribution lines 212-1, 212-2, and one or more valves 216 may be associated with the couplings therebetween to control air flow provided from one or more of the sources 210-1, 210-2 via the main distribution lines 212-1, 212-2 to the first supplementary distribution line 214-1. In addition, a second supplementary distribution line 214-2 may also couple to each of the main distribution lines 212-1, 212-2, and one or more valves 216 may be associated with the couplings therebetween to control air flow provided from one or more of the sources 210-1, 210-2 via the main distribution lines 212-1, 212-2 to the second supplementary distribution line 214-2. Further, a third supplementary distribution line 214-3 may couple to each of the main distribution lines 212-1, 212-2, and one or more valves 216 may be associated with the couplings therebetween to control air flow provided from one or more of the sources 210-1, 210-2 via the main distribution lines 212-1, 212-2 to the third supplementary distribution line 214-3. Moreover, a fourth supplementary distribution line 214-4 may couple to each of the main distribution lines 212-1, 212-2, and one or more valves 216 may be associated with the couplings therebetween to control air flow provided from one or more of the sources 210-1, 210-2 via the main distribution lines 212-1, 212-2 to the fourth supplementary distribution line 214-4.

Further, in the example embodiments of FIG. 2, a valve 216 associated with the coupling between the main distribution line 212-2 and the first supplementary distribution line 214-1 may be open, such that air flow received from the chilled air source 210-2 may be provided to the first supplementary distribution line 214-1, as indicated by the similar hashmarks of FIG. 2. Similarly, valves 216 associated with the couplings between the main distribution line 212-2 and the second and fourth supplementary distribution lines 214-2, 214-4 may be open, such that air flow received from the chilled air source 210-2 may be provided to the second and fourth supplementary distribution lines 214-2, 214-4, as also indicated by the similar hashmarks of FIG. 2. Moreover, a valve 216 associated with the coupling between the main distribution line 212-1 and the third supplementary distribution line 214-3 may be open, such that air flow received from the frozen air source 210-1 may be provided to the third supplementary distribution line 214-3, as further indicated by the similar hashmarks of FIG. 2. Furthermore, by changing the opening and closing of various valves 216, each of the supplementary distribution lines 214 may be selectively coupled to one or more of the main distribution lines to provide air flow from respective associated sources.

As shown in FIG. 2, each of the supplementary distribution lines 214 may couple to and be associated with a plurality of storage positions and associated containers 220. Although FIG. 2 illustrates eight storage positions and associated containers 220 that may couple to each of the supplementary distribution lines 214, other example embodiments may include any other number of storage positions and associated containers 220 associated with each supplementary distribution line 214, e.g., one, two, five, ten, fifty, one hundred, or any other number of storage positions and associated containers. Further, each supplementary distribution line 214 may couple to and be associated with a different number of storage positions and associated containers than one or more other supplementary distribution lines 214.

In further example embodiments, main and supplementary distribution lines 212, 214 may not be separate, distinct, and/or coupled via valves. Instead, one or more main distribution lines may couple to and be directly associated with one or more storage positions and associated containers to provide air flow directly from one or more sources to the storage positions and associated containers.

In example embodiments, in addition to the plurality of valves 216 described herein with respect to couplings between main and supplementary distribution lines 212, 214, one or more bleeder valves 218 may be associated with portions of the main or supplementary distribution lines 212, 214 and/or at or proximate connections to one or more storage positions and associated containers 220. For example, the bleeder valves may be controlled to open or close to modify various environment attributes of the air flow within the distribution lines. When a bleeder valve is at least partially open, the bleeder valve may allow air flow from an environment outside the distribution line into the air flow within the distribution line. As described herein, the various environment attributes that may be modified or adjusted may include temperature, humidity, air pressure, air flow rate, and/or other environment attributes.

In some example embodiments as shown in FIG. 2, a bleeder valve 218 may be associated with each supplementary distribution line 214, and configured to modify or adjust environment attributes of air flow within the supplementary distribution line 214 and associated storage positions and containers 220. For example, each bleeder valve 218 shown in FIG. 2 may modify or adjust environment attributes of air flow that is provided to each of the eight storage positions and associated containers 220, or other numbers of storage positions and associated containers, that are coupled to each respective supplementary distribution line 214-1, 214-2, 214-3, 214-4.

In other example embodiments, one or more bleeder valves 218 may be positioned at other portions of the main or supplementary distribution lines 212, 214. In addition, one or more bleeder valves 218 may be positioned at or proximate connections to individual storage positions and associated containers 220, such that environment attributes of air flow provided to specific storage positions and associated containers may be modified or adjusted.

In example embodiments, the plurality of containers 220 positioned at storage positions of a storage system or array may couple to portions of the distribution network e.g., to portions of distribution lines associated with respective storage positions. For example, the plurality of containers 220 may comprise insulated containers having items that may require or benefit from environment control. In other example embodiments, the plurality of containers 220 may also comprise non-insulated containers having items that may not require or need environment control, and the non-insulated containers may not be configured to couple to portions of the distribution network.

In some example embodiments, insulated containers may receive various types of items, including grocery items, such as breads, grains, produce, vegetables, fruits, dairy, liquids, proteins, frozen foods, or other grocery items, other types of items that may spoil or expire under certain environment attributes, and/or other items for which a cold chain may need to be maintained. In additional example embodiments, non-insulated containers may also receive various types of items, including grocery items, such as dry goods, canned goods, condiments, paper products, plastic products, or other grocery items, and/or other types of items, such as clothing, shoes, electronics, books, media, tools, toys, sporting goods, automotive parts, or other items, for which a cold chain may not need to be maintained.

The insulated containers may include connections or couplings to enable air flow communication with portions of the distribution lines associated with respective storage positions, whereas the non-insulated containers may not include such connections or couplings. In some example embodiments, the connections or couplings between distribution lines and containers may include supply lines and associated supply valves on the distribution line side, which couple to input lines and associated input valves on the container side. In addition, one or more valves, e.g., bleeder or pressure release valves may be associated with the containers to facilitate air flow into the containers from the distribution lines.

In other example embodiments, in addition to the supply lines and associated supply valves on the distribution line side, which couple to input lines and associated input valves on the container side, the connections or couplings between distribution lines and containers may further include return lines and associated return valves on the distribution line side, which couple to output lines and associated output valves on the container side. In this manner, the distribution network may comprise a substantially closed system with air flow that circulates between and among the sources 210, distribution lines 212, 214, and containers 220, which may minimize thermal energy losses and increase the efficiency and reliability of the distribution network. Further details of the plurality of containers 220, storage positions, and couplings and connections between containers 220 and distribution lines are described herein at least with respect to FIGS. 3 and 4.

In example embodiments, the plurality of sensors 222, 224, 226, 228, 230 may include various types of sensors, including temperature sensors, humidity sensors, pressure sensors, air flow rate sensors, and/or other types of sensors. Various sensors may be positioned at various positions or portions of the sources, the distribution lines, the storage positions, and/or the containers to detect environment attributes associated with portions of the distribution network and/or containers.

In the example embodiment shown in FIG. 2, a first sensor 222-1 may be coupled to and associated with main distribution line 212-1, and a second sensor 222-2 may be coupled to and associated with main distribution line 212-2. The sensors 222 may be positioned along any portions of the main distribution lines 212. In addition, the sensors 222 may detect data associated with various environment attributes of air flow within the main distribution lines 212, including temperature, humidity, pressure, air flow rate, and/or other attributes.

In an example embodiment shown in FIG. 2, a sensor 224 may be coupled to and associated with supplementary distribution line 214-1. The sensor 224 may be positioned along any portion of the supplementary distribution line 214-1. In addition, the sensor 224 may detect data associated with various environment attributes of air flow within the supplementary distribution line 214-1, including temperature, humidity, pressure, air flow rate, and/or other attributes.

In another example embodiment shown in FIG. 2, a plurality of sensors 226 may be coupled to and associated with supplementary distribution line 214-2. The plurality of sensors 226 may be positioned at or proximate connections or couplings to storage positions and associated containers 220 along the supplementary distribution line 214-2. In addition, the plurality of sensors 226 may detect data associated with various environment attributes of air flow at or proximate connections or couplings to storage positions and associated containers 220 along the supplementary distribution line 214-2, including temperature, humidity, pressure, air flow rate, and/or other attributes.

In a further example embodiment shown in FIG. 2, a plurality of sensors 228 may be coupled to and associated with individual containers 220 that are coupled to the supplementary distribution line 214-3. The plurality of sensors 228 may be positioned within the interior of respective individual containers 220 coupled to the supplementary distribution line 214-3. In addition, the plurality of sensors 228 may detect data associated with various environment attributes of air flow within the interior of respective individual containers 220 coupled to the supplementary distribution line 214-3, including temperature, humidity, pressure, air flow rate, and/or other attributes.

In yet another example embodiment shown in FIG. 2, a plurality of sensors 230 may be coupled to and associated with substantially opposite ends of the supplementary distribution line 214-4. For example, a first sensor 230 may be positioned at or proximate a first end of the supplementary distribution line 214-4, and a second sensor 230 may be positioned at or proximate a second, opposite end of the supplementary distribution line 214-4. Further, if the first and second sensors 230 comprise pressure sensors, a pressure drop, gradient, or differential between opposite ends of the supplementary distribution line 214-4 may be detected or measured. Based on the detected pressure gradient, a number of connections or couplings that are open to provide air flow to respective containers may be determined, e.g., based on estimated or experimental data related to expected pressure gradients upon opening one or more connections or couplings to provide air flow to respective containers. In addition, the plurality of sensors 230 may detect data associated with various environment attributes of air flow at respective portions or ends of the supplementary distribution line 214-4, including temperature, humidity, pressure, air flow rate, and/or other attributes.

Although FIG. 2 illustrates a few example embodiments related to numbers, types, positions, and arrangements of one or more sensors associated with a distribution network and/or one or more containers, other example embodiments may combine or modify various aspects of the example embodiments. In addition, other example embodiments may include various other numbers, types, positions, and arrangements of one or more sensors associated with a distribution network and/or one or more containers.

Based on the data detected or measured by one or more sensors, various environment attributes associated with portions of the distribution network and/or one or more containers may be controlled more precisely and with greater accuracy, e.g., by modifying operations of one or more sources, and/or one or more valves or bleeder valves. In addition, one or more faults, errors, or problems may be detected and identified based on data detected or measured by one or more sensors, e.g., problems associated with one or more sources, faults associated with one or more valves, errors or problems associated with one or more sensors, mechanical issues or damage along portions of the distribution network and/or containers, leaks or losses associated with portions of the distribution network and/or containers, and/or various other faults or errors.

Further, based on the data detected or measured by one or more sensors, a cold chain associated with one or items stored within containers may be maintained more accurately and reliably. Moreover, based on the data detected or measured by one or more sensors, a break, gap, or other issue in the cold chain associated with one or items stored within containers may also be detected and identified more accurately and reliably.

Although FIG. 2 illustrates a particular number, type, size, configuration, and arrangement of sources, distribution lines, valves, containers and storage positions, and/or sensors, other example embodiments may include various other numbers, types, sizes, configurations, and/or arrangements of the various components of distribution networks. For example, other example distribution networks may include only one source, may include two or more sources, and/or may include sources of other types of environment attributes. In addition, various distribution lines may have different shapes, sizes, lengths, dimensions, and/or other attributes in various example distribution networks. Further, various numbers and types of valves, sensors, containers, and storage positions may be positioned at various other positions within other example distribution networks. Various other modifications are possible in other example distribution networks.

Using the distribution network and associated containers described herein, environment attributes of containers may be controlled substantially individually and at least partially independently of one or more other containers. By controlled operation of the sources, valves, connections, and/or sensors, desired environment attributes for individual containers at respective storage positions of a storage system or array may be effectively and efficiently achieved. Further, environment attributes for individual containers at respective storage positions may be modified or adjusted over time as needed, such that each storage position may be provided with air flow having desired environment attributes substantially on-demand and in real-time.

Figure 3:
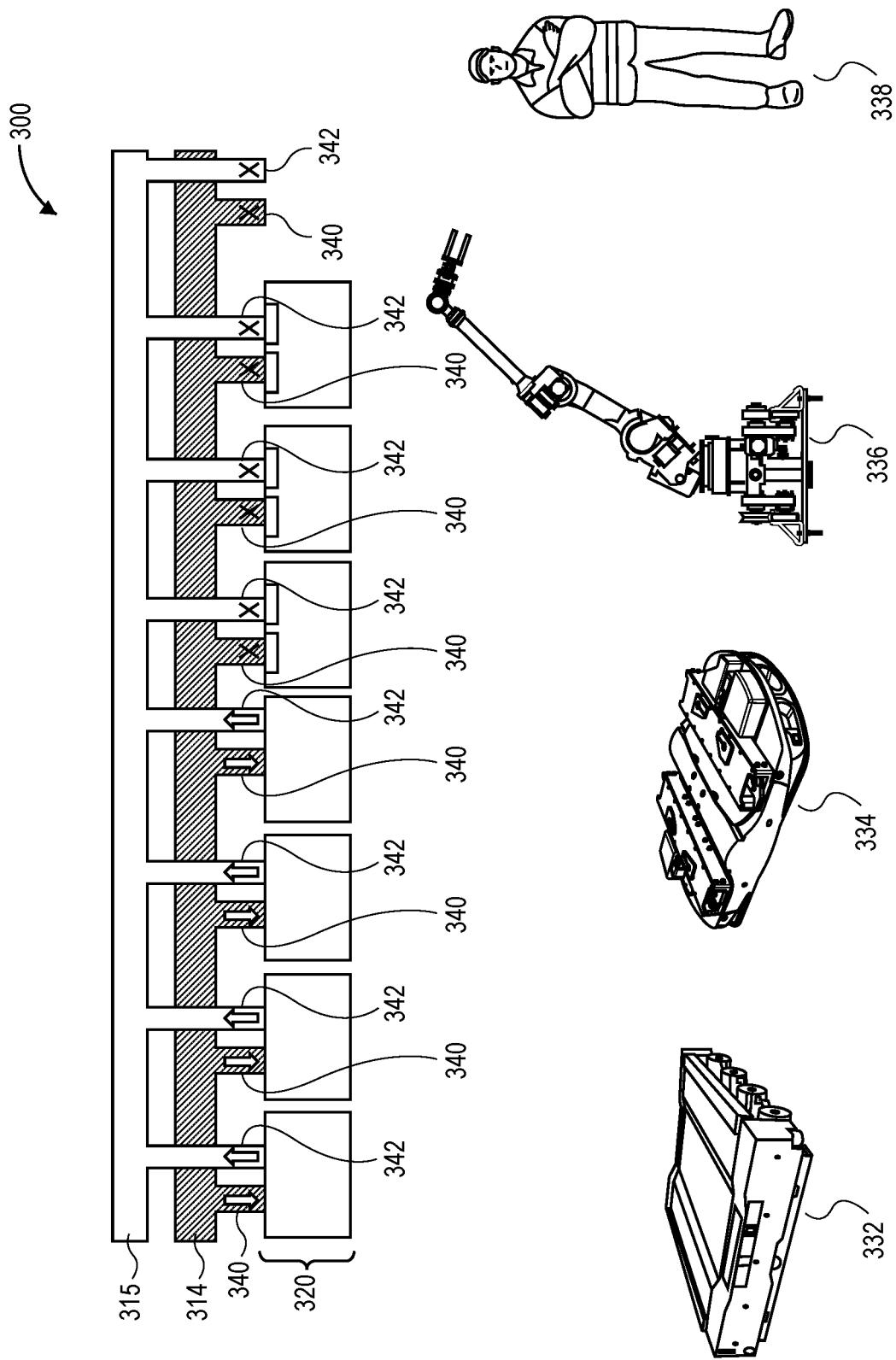
FIG. 3 is a schematic, partial overhead view diagram of a portion of an example container-based environment control system and method and associated transfer agents, in accordance with implementations of the present disclosure.

FIG. 3 is a schematic, overhead view diagram 300 of a portion of an example container-based environment control system and method and associated transfer agents, in accordance with implementations of the present disclosure.

As shown in FIG. 3, a portion of an example container-based environment control system may include one or more distribution lines 314, 315, one or more containers 320 positioned at storage positions of a storage system or array, and/or one or more valves 340, 342.

In example embodiments, the one or more distribution lines 314, 315 may comprise and/or include any and all of the features of the main or supplementary distribution lines and/or other portions of the distribution network described at least with respect to FIG. 2, including any valves, bleeder valves, sensors, and/or other features. In addition, the distribution lines may include a supply distribution line 314 and a return distribution line 315, such that the environment control system may operate as a substantially closed system. For example, the supply distribution line 314 may provide air flow for environment control from one or more sources to one or more storage positions and associated containers 320, and the return distribution line 315 may return air flow for environment control from one or more storage positions and associated containers 320 back to one or more sources.

At respective storage positions, no containers may be positioned or present, one or more non-insulated containers 320 may be positioned without coupling to the distribution lines 314, 315, and/or one or more insulated containers 320 may be positioned to couple or connect to the distribution lines 314, 315 via one or more valves 340, 342. In the example of FIG. 3, portions of the supply distribution line 314 may include supply valves 340 at or proximate the storage positions and associated containers 320, and portions of the return distribution line 315 may include return valves 342 at or proximate the storage positions and associated containers 320. Moreover, insulated containers 320 may also include corresponding valves or portions of valves that couple or connect to the supply and/or return valves 340, 342 of the supply and/or return distribution lines 314, 315. Further details of insulated containers and associated valves are described herein at least with respect to FIG. 4.

When a container is not positioned at a respective storage position, the associated valves 340, 342 may be in normally closed positions to prevent air flow and minimize thermal energy losses. For example, as shown at the rightmost storage position on the right side of FIG. 3, a supply valve 340 and a return valve 342 may be in normally closed positions, e.g., indicated by X's in FIG. 3, to prevent air flow in the absence of a container positioned at the respective storage position.

When non-insulated containers 320 are positioned at respective storage positions, the associated valves 340, 342 may also remain in normally closed positions to prevent air flow and minimize thermal energy losses. For example, as shown at the three storage positions to the left of the rightmost storage position of FIG. 3, supply valves 340 and return valves 342 may remain in normally closed positions, e.g., indicated by X's in FIG. 3, to prevent air flow in response to positioning one or more non-insulated containers at the respective storage positions. In example embodiments, non-insulated containers may not have features, tubes, pipes, lines, and/or valves to be able to connect or couple to the distribution lines 314, 315 and associated valves 340, 342.

When insulated containers 320 are positioned at respective storage positions, the associated valves 340, 342 may be moved or transitioned to open positions to allow air flow communication between the distribution lines 314, 315 and the containers 320. For example, as shown at the four storage positions on the left side of FIG. 3, supply valves 340 and return valves 342 may be moved to open positions, e.g., indicated by arrows in FIG. 3, to allow air flow in response to positioning one or more insulated containers at the respective storage positions. In example embodiments, insulated containers may have features, tubes, pipes, lines, and/or valves to be able to connect or couple to the distribution lines 314, 315 and associated valves 340, 342.

In example embodiments, the supply and/or return valves 340, 342 may comprise one-way valves, check valves, non-return valves, shut-off valves, or other similar types of valves. In addition, the supply and/or return valves 340, 342 may comprise passive, spring-loaded valves that are biased toward normally closed positions. Generally, the supply and/or return valves 340, 342, when in open positions, may allow air flow in only one direction. Thus, a supply valve 340, when in an open position, may allow air flow in a direction from a supply distribution line 314 into a container 320, and a return valve 342, when in an open position, may allow air flow from a container 320 back to a return distribution line 315.

Figure 4:
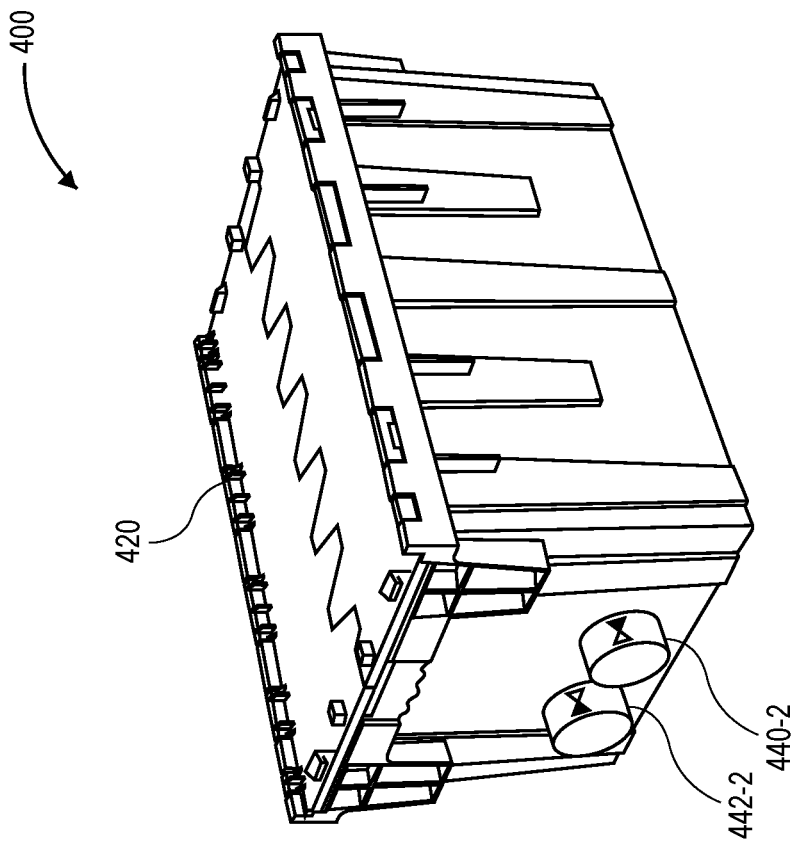
FIG. 4 is a schematic diagram of an example container and storage position of an example container-based environment control system and method, in accordance with implementations of the present disclosure.
Figure 4:
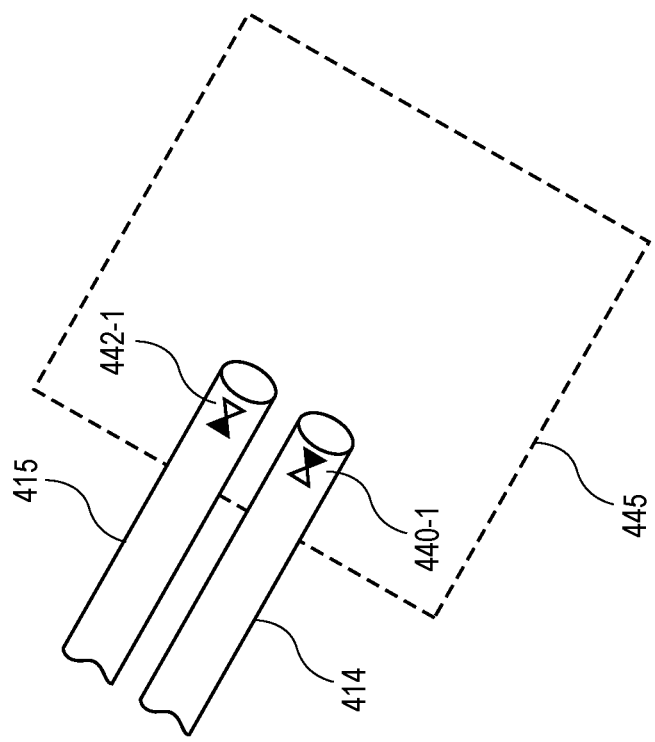

FIG. 4 is a schematic diagram 400 of an example container and storage position of an example container-based environment control system and method, in accordance with implementations of the present disclosure.

As shown in FIG. 4, a portion of a supply distribution line 414 and associated supply valve 440-1 and a portion of a return distribution line 415 and associated return valve 442-1 may be positioned at or proximate a storage position 445 of a storage system or array. In addition, an insulated container 420 that is configured to be placed or positioned at one or more storage positions may include an input line having an input valve 440-2 and an output line having an output valve 442-2. The supply and return distribution lines and associated supply and return valves shown in FIG. 4 may include any and all of the features of the main or supplementary distribution lines and/or other portions of the distribution network described at least with respect to FIG. 2, including any valves, bleeder valves, sensors, and/or other features, and/or any and all of the features of similar components described at least with respect to FIG. 3.

In example embodiments, the insulated container 420 may comprise a double-walled, insulated tote, crate, box, bag, pouch, or other type of container. In addition, the insulated container 420 may include an input valve 440-2 configured to couple or mate with a supply valve 440-1 at a storage position, and an output valve 442-2 configured to couple or mate with a return valve 442-1 at a storage position. In some example embodiments, portions of an interior of the insulated container 420 may also include features, channels, paths, or other structures or designs associated with a base, walls, cover, or other panels or surfaces to facilitate air flow within the container 420 or around and between items that may be held or carried by the container 420. Further, the insulated container 420 may also include one or more sensors, as described herein, to detect and measure environment attributes within the container 420.

In other example embodiments, the insulated container 420 may include only an input valve 440-2 configured to couple or mate with a supply valve 440-1 at a storage position, and may also potentially include a pressure release valve, bleeder valve, or similar pressure relief or valve structure to facilitate air flow into the insulated container 420 from the supply distribution line 414, e.g., to prevent pressure build-up or dead-heading within the container 420.

In example embodiments as shown in FIG. 4, the supply and return valves 440-1, 442-1 associated with a storage position may engage, cooperate, or couple with corresponding input and output valves 440-2, 442-2 associated with an insulated container 420 to allow air flow communication between portions of the distribution lines 414, 415 and the container 420. For example, the input and/or output valves 440-2, 442-2 associated with an insulated container 420 may also comprise one-way valves, check valves, non-return valves, shut-off valves, or other similar types of valves. In addition, the input and/or output valves 440-2, 442-2 may comprise passive, spring-loaded valves that are biased toward normally closed positions. Generally, the input and/or output valves 440-2, 442-2 associated with an insulated container 420, when in open positions, may also allow air flow in only one direction. Thus, an input valve 440-2, when mated with a supply valve 440-1 and in an open position, may allow air flow in a direction from a supply distribution line 414 into a container 420, and an output valve 442-2, when mated with a return valve 442-1 and in an open position, may allow air flow from a container 420 back to a return distribution line 415.

In this manner, the supply and/or return valves 440-1, 442-1 may comprise portions, parts, or halves of double shut-off disconnect valves, and the corresponding input and/or output valves 440-2, 442-2 associated with insulated containers 420 may comprise mating portions, parts, or halves of the double shut-off disconnect valves. Because the supply and/or return valves 440-1, 442-1 and the corresponding input and/or output valves 440-2, 442-2 associated with insulated containers 420 may be biased toward normally closed positions, when an insulated container 420 is not positioned at a storage position 445, the supply and/or return valves 440-1, 442-1 associated with the storage position 445 may be in normally closed positions to prevent air flow and minimize thermal energy losses from the distribution lines 414, 415. Similarly, the input and/or output valves 440-2, 442-2 associated with the insulated container 420 may also be in normally closed positions to prevent air flow and minimize thermal energy losses from the container 420.

Referring again to FIG. 3, in example embodiments, one or more agents 332, 334, 336, 338 may engage, lift, move, and/or transfer one or more containers relative to one or more storage positions of a storage system or array. For example, the agents may comprise shuttles 332 generally associated with automated storage and retrieval systems, robotic drive units 334 that may generally transfer containers or totes within container- or tote-based automated storage and retrieval systems, robotic arms 336 or similar robotic or automated machinery or equipment, and/or human agents or associates 338. The one or more agents may place or position one or more containers 320 at respective storage positions, and the one or more agents may also remove or retrieve one or more containers 320 from respective storage positions.

Referring back to FIG. 4, when a container is not positioned at a respective storage position 445, the supply and/or return valves 440-1, 442-1 may be in normally closed positions to prevent air flow and minimize thermal energy losses. In addition, when a non-insulated container is positioned at a storage position 445, the supply and/or return valves 440-1, 442-1 at the storage position may remain in normally closed positions to prevent air flow and minimize thermal energy losses because the non-insulated container may not have features, tubes, pipes, lines, and/or valves to be able to connect or couple to the distribution lines 414, 415 and associated valves 440-1, 442-1. In addition, when a non-insulated container is removed from a storage position, the supply and/or return valves 440-1, 442-1 at the storage position may again remain in normally closed positions to prevent air flow and minimize thermal energy losses because the non-insulated container may not have connected or coupled to the distribution lines 414, 415 and associated valves 440-1, 442-1.

When an insulated container 420 is positioned at a respective storage position 445, the input and/or output valves 440-2, 442-2 associated with the insulated container 420 may engage or couple with the supply and/or return valves 440-1, 442-1, respectively, and may move or transition each of the valves to open positions to allow air flow communication between the distribution lines 414, 415 and the insulated container 420. In addition, when an insulated container 420 is removed from a respective storage position 445, the input and/or output valves 440-2, 442-2 associated with the insulated container 420 may disengage or decouple from the supply and/or return valves 440-1, 442-1, respectively, and may move or transition each of the valves to closed positions to prevent air flow communication between the distribution lines 414, 415 and the insulated container 420 and minimize thermal energy losses therefrom.

For example, when disconnected or decoupled from each other, the supply valve 440-1 and the input valve 440-2 may individually comprise passive, spring-loaded, one-way, shut-off valves that are in normally closed positions to prevent air flow. As a result, air flow and thermal energy losses from the supply distribution line 414 and the container 420 may be prevented or minimized. When mated or engaged together, the supply valve 440-1 and the input valve 440-2 may together comprise a double shut-off disconnect valve that moves or transitions to an open position to allow air flow therethrough. As a result, air flow communication may be established from the supply distribution line 414 to the container 420 for environment control.

Likewise, when disconnected or decoupled from each other, the return valve 442-1 and the output valve 442-2 may individually comprise passive, spring-loaded, one-way, shut-off valves that are in normally closed positions to prevent air flow. As a result, air flow and thermal energy losses from the return distribution line 415 and the container 420 may be prevented or minimized. When mated or engaged together, the return valve 442-1 and the output valve 442-2 may together comprise a double shut-off disconnect valve that moves or transitions to an open position to allow air flow therethrough. As a result, air flow communication may be established from the container 420 to the return distribution line 415 for environment control.

By using passive, spring-loaded, one-way, shut-off valves for each of the supply and/or return valves 440-1, 442-1 and the input and/or output valves 440-2, 442-2, the valves may be opened or closed as a result of movement or transfer of insulated containers 420 by the one or more agents. For example, during positioning or placement of an insulated container 420 at a storage position 445, the valves 440-1, 442-1 of the distribution lines 414, 415 and the valves 440-2, 442-2 of the insulated container 420 may substantially automatically and passively engage with each other and cause opening of the respective valves. Thus, air flow communication between the distribution lines and insulated containers may be substantially automatically established upon positioning or placement of insulated containers at respective storage positions.

Likewise, during removal or retrieval of an insulated container 420 from a storage position 445, the valves 440-1, 442-1 of the distribution lines 414, 415 and the valves 440-2, 442-2 of the insulated container 420 may substantially automatically and passively disengage from each other and cause closing of the respective valves. Thus, air flow communication between the distribution lines and insulated containers may be substantially automatically stopped or prevented upon removal or retrieval of insulated containers from respective storage positions.

In further example embodiments, one or more of the supply valves 440-1, return valves 442-1, input valves 440-2, and/or output valves 442-2 may have associated actuators, such as motors, solenoids, servos, or other types of actuators. Such actuators may enable control of opening and closing of individual valves by a controller or control system, which in some embodiments may substantially replace the passive actuation of individual valves described herein. In some example embodiments, actuators associated with individual valves may enable more precise, granular, or graduated control over the amount of opening or closing of individual valves, which may allow increased and specific control over various environment attributes within insulated containers.

Although FIGS. 3 and 4 illustrate particular numbers, types, sizes, shapes, configurations, or arrangements of distribution lines, storage positions, containers, valves, and/or automated agents, other example embodiments may include various other numbers, types, sizes, shapes, configurations, or arrangements of the various components described herein. For example, the distribution lines and input/output lines of containers may have different sizes, shapes, cross-sections, or other characteristics. In addition, the various valves may be configured or arranged in different positions or orientations relative to storage positions and/or containers. Further, the containers may have various different types, sizes, shapes, configurations, or arrangements other than substantially rectangular prisms with openable lids or covers as shown in FIG. 4. Moreover, various other types of robotic or automated agents may move or transport containers relative to storage positions of a storage system or array.

Figure 5:
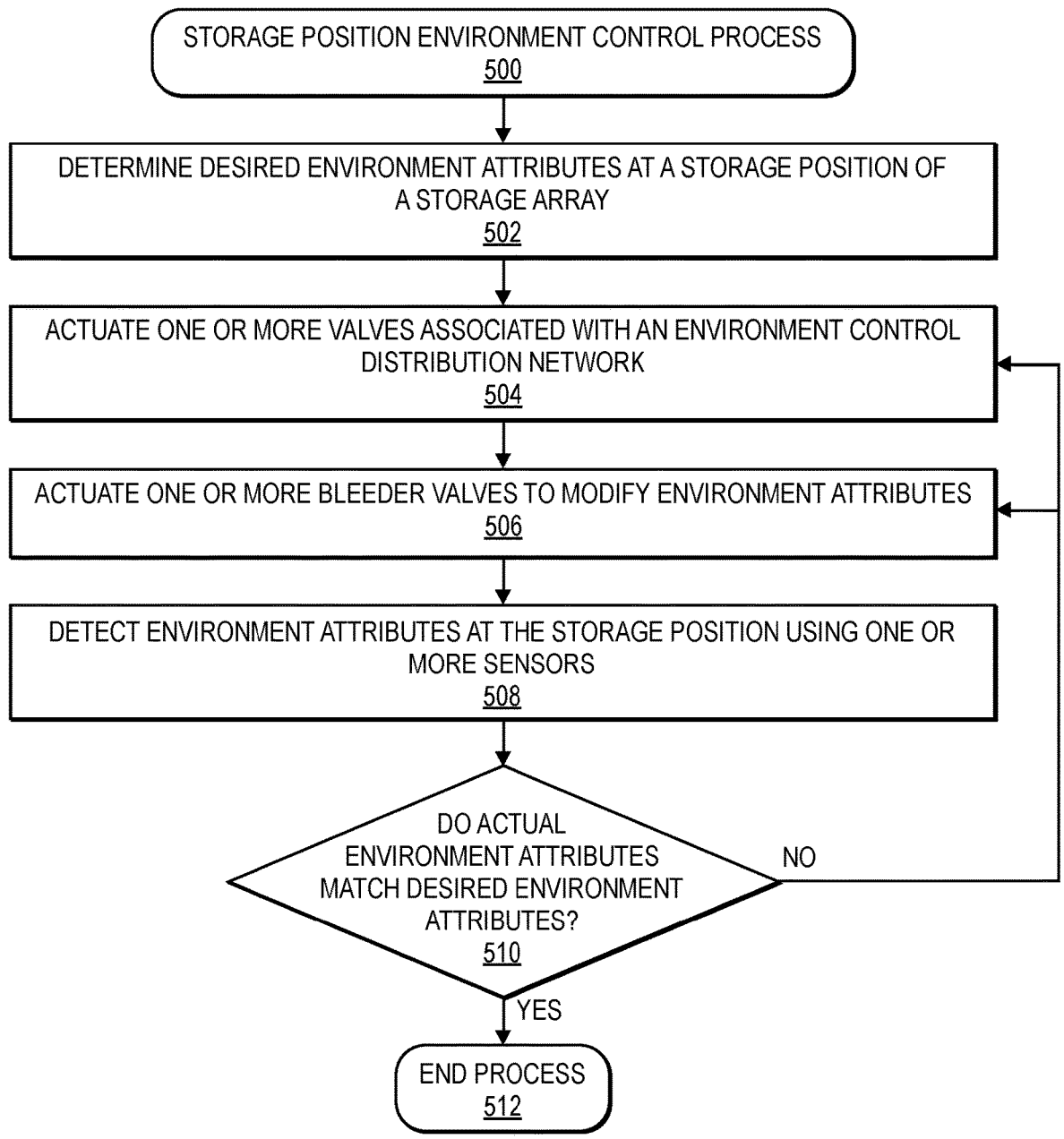
FIG. 5 is a flow diagram illustrating an example storage position environment control process, in accordance with implementations of the present disclosure.

FIG. 5 is a flow diagram illustrating an example storage position environment control process 500, in accordance with implementations of the present disclosure.

The process 500 may begin by determining desired environment attributes at a storage position of a storage array, as at 502. For example, desired environment attributes may comprise temperature, humidity, pressure, air flow rate, or other attributes associated with the storage position. In addition, the desired environment attributes may be determined based on a container to be stored at a storage position, including one or more items within or carried by the container. As described herein, various types of items may need to be stored according to various environment attributes, e.g., to maintain a cold chain for one or more of the items. Further, a controller may determine desired environment attributes at a storage position.

The process 500 may continue by actuating one or more valves associated with an environment control distribution network, as at 504. For example, one or more valves associated with main, supplementary, or other distribution lines of a distribution network may be actuated in order to allow air flow from one or more sources to the storage position, in order to provide the desired environment attributes at the storage position. A plurality of sources may provide air flow having various different environment attributes, and one or more of the sources may be selected via appropriate operation of one or more valves of the distribution network. Further, a controller may actuate one or more valves associated with a distribution network.

The process 500 may proceed by actuating one or more bleeder valves to modify environment attributes, as at 506. For example, one or more bleeder valves associated with main, supplementary, or other distribution lines of a distribution network may be actuated in order to allow air from other sources, e.g., ambient air or outside air, into the air flow from one or more sources to the storage position, in order to modify the air flow to have the desired environment attributes at the storage position. A plurality of bleeder valves may be available to modify the air flow with various different environment attributes, and one or more of the bleeder valves may be selected to modify environment attributes within portions of the distribution network. Further, a controller may actuate one or more bleeder valves associated with a distribution network to modify environment attributes.

The process 500 may continue to detect environment attributes at the storage position using one or more sensors, as at 508. For example, the one or more sensors may comprise temperature sensors, humidity sensors, pressure sensors, air flow rate sensors, or other types of sensors. In addition, the sensors may be positioned at various portions of the distribution network, at one or more sources, along distribution lines, at or proximate storage positions, and/or within one or more containers. Based on data detected by the sensors, environment attributes at or proximate the storage position, and/or within the container at the storage position, may be determined or measured. Further, a controller may detect environment attributes at a storage position using data from sensors.

The process 500 may proceed to determine whether the actual environment attributes match desired environment attributes, as at 510. For example, the determined or measured environment attributes at or proximate the storage position, and/or within the container at the storage position, may be compared with the desired environment attributes for the storage position of the storage array. The comparison may comprise one or more of the desired environment attributes, including temperature, humidity, pressure, air flow rate, or other attributes. Further, a controller may determine whether the actual environment attributes match the desired environment attributes.

If it is determined that the actual environment attributes do not match the desired environment attributes, the process 500 may return to step 504 to continue to actuate one or more valves of the distribution network, and/or may return to step 506 to continue to actuate one or more bleeder valves of the distribution network, in order to further modify the environment attributes at the storage position to match the desired environment attributes. This portion of the process may continue to iterate until it is determined that the actual environment attributes match the desired environment attributes.

If it is determined that the actual environment attributes match the desired environment attributes, the process may end as at 512. For example, the distribution network, including one or more valves, bleeder valves, sensors, or other components, may then continue to operate to maintain the desired environment attributes at the storage position, e.g., as long as the container having one or more items associated with the desired environment attributes is positioned at the storage position.

In this manner, distribution networks of container-based environment control systems and methods as described herein may generate and maintain desired environment attributes at respective storage positions of a storage system or array. Further, the distribution networks may generate and maintain different environment attributes for different respective storage positions that may receive different respective containers and items, as desired.

Figure 6:
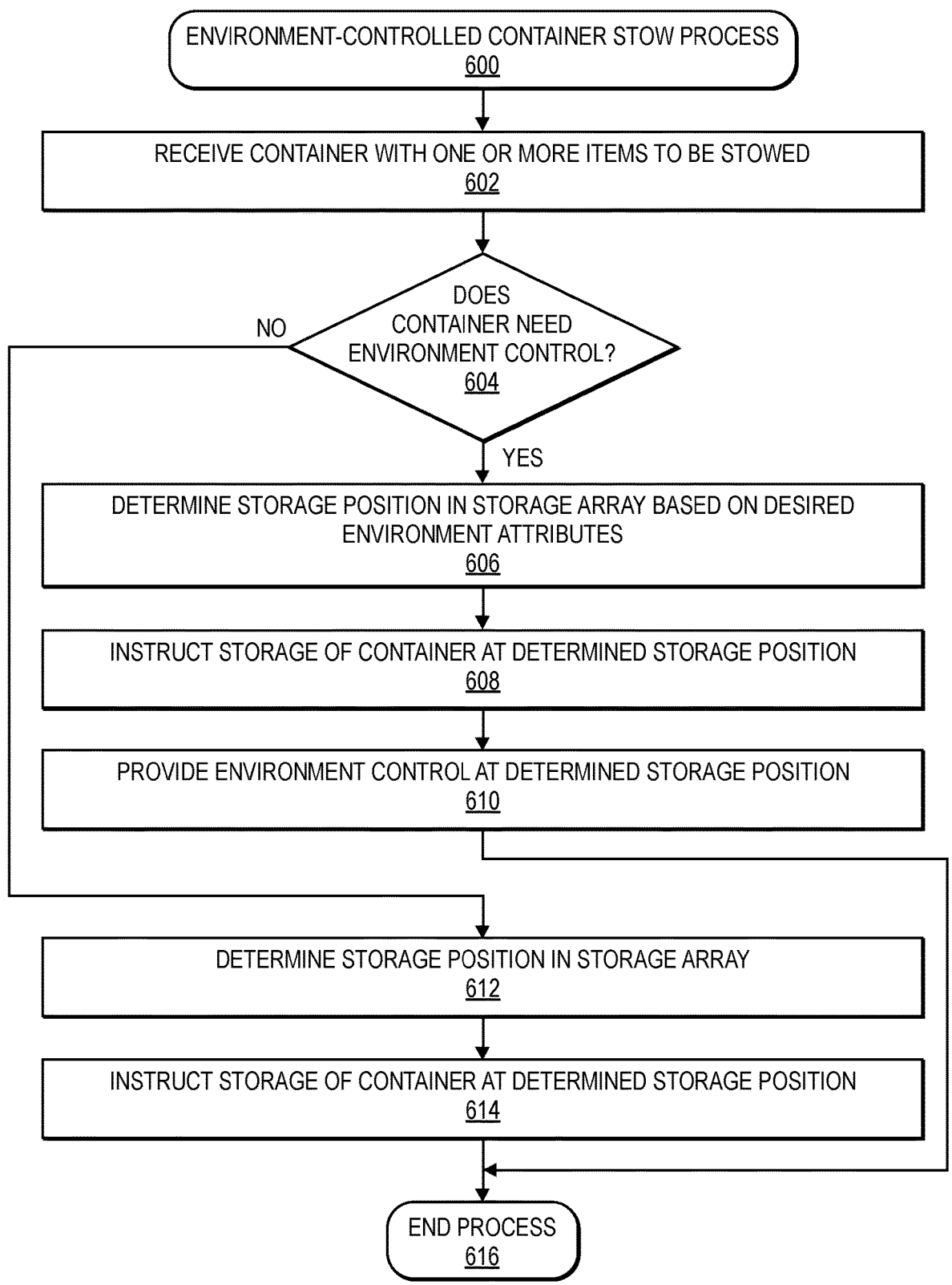
FIG. 6 is a flow diagram illustrating an example environment-controlled container stow process, in accordance with implementations of the present disclosure.

FIG. 6 is a flow diagram illustrating an example environment-controlled container stow process 600, in accordance with implementations of the present disclosure.

The process 600 may begin by receiving a container with one or more items to be stowed, as at 602. For example, a container may receive or carry various types of items. Some items may require particular environment attributes to maintain freshness, quality, appearance, and/or various other characteristics. Other items may not require any particular environment attributes, and may simply be stored at ambient temperatures. Various types of items in various containers may be received and stored in respective storage positions of a storage system or array. Further, a controller may receive information related to a container with one or more items to be stowed.

The process 600 may continue by determining whether the container needs environment control, as at 604. For example, based on the one or more items carried by a container, it may be determined whether various environment attributes should be controlled for the container. As described herein, the various environment attributes may include temperature, humidity, pressure, air flow rate, and/or other attributes. Further, a controller may determine whether a container and associated items need environment control.

If it is determined that a container does need environment control, the process 600 may proceed by determining a storage position in a storage array based on desired environment attributes, as at 606. For example, a storage position may be selected from a plurality of storage positions in the storage array. Depending on a configuration of a distribution network and associated distribution lines, valves, sensors, and/or other components, one or more storage positions may be preferred or ideal based on the desired environment attributes for the container. For example, if a different container having items with similar desired environment attributes is already stored at a storage position, one or more storage positions coupled or connected to similar portions of the distribution network may readily provide the desired environment attributes for the container. In addition, in some example embodiments, only some storage positions of a storage array may be equipped to provide environment control, whereas in other example embodiments, all storage positions of a storage array may be equipped to provide environment control. Further, a storage position for the container may be further selected based on other attributes associated with items in the container, such as item pick velocity or frequency, next predicted pick time, other containers having similar or the same items at other storage positions, and/or other attributes. Various other factors or attributes may contribute to a selection of a storage position for the container. Further, a controller may determine a storage position for the container based on desired environment attributes.

The process 600 may then continue to instruct storage of the container at the determined storage position, as at 608. For example, one or more agents, such as shuttles, robotic drive units, robotic arms, other robotic or automated equipment or machines, and/or human agents or associates, may position or place the container at the determined storage position in the storage system or array. As described herein, upon positioning the container at the storage position, an input line and input valve of the container may automatically connect or couple to a supply line and supply valve of the distribution network, in order to provide environment control to an interior of the container. In addition, an output line and output valve of the container may also automatically connect or couple to a return line and return valve of the distribution network. The input and supply valves may couple together to form a double shut-off disconnect valve, and the output and return valves may also couple together to form a double shut-off disconnect valve. Moreover, a data store or memory may be updated with associations between the container and the storage position, to facilitate later identification and retrieval of the container and/or one or more items carried therein. Further, a controller may instruct an agent to store the container at the determined storage position.

The process 600 may then proceed to provide environment control at the determined storage position, as at 610.

For example, portions of the distribution network may provide air flow having the desired environment attributes to the determined storage position, substantially as described herein with respect to FIG. 5. In addition, because the input and supply valves may automatically connect and move to open positions upon placement of the container at the storage position, air flow communication may be enabled between the supply line and an interior of the container. Moreover, because the output and return valves may also automatically connect and move to open positions upon placement of the container at the storage position, air flow communication may be enabled between the interior of the container and the return line. Further, a controller may instruct a distribution network to provide environment control having desired environment attributes at the storage position. The process 600 may then end, as at 616.

Returning to step 604, if, however, it is determined that a container does not need environment control, the process 600 may continue with determining a storage position in a storage array, as at 612. For example, a storage position may be selected from a plurality of storage positions in the storage array. Depending on a configuration of a distribution network and associated distribution lines, valves, sensors, and/or other components, one or more storage positions may be preferred or ideal for the container that does not need environment control, and/or one or more storage positions may be reserved or maintained available for other containers that may need environment control. In addition, in some example embodiments, only some storage positions of a storage array may be equipped to provide environment control, whereas in other example embodiments, all storage positions of a storage array may be equipped to provide environment control. Further, a storage position for the container may be further selected based on other attributes associated with items in the container, such as item pick velocity or frequency, next predicted pick time, other containers having similar or the same items at other storage positions, and/or other attributes. Various other factors or attributes may contribute to a selection of a storage position for the container. Further, a controller may determine a storage position for the container.

The process 600 may then proceed with instructing storage of the container at the determined storage position, as at 614. For example, one or more agents, such as shuttles, robotic drive units, robotic arms, other robotic or automated equipment or machines, and/or human agents or associates, may position or place the container at the determined storage position in the storage system or array. As described herein, a container that does not need environment control may not include features, such as input lines, input valves, output lines, and/or output valves, to connect or couple to portions of a distribution network. As a result, any supply lines and supply valves, and/or return lines and return valves, associated with the storage position may remain in normally closed positions to prevent air flow and minimize thermal energy losses associated with the distribution network. Moreover, a data store or memory may be updated with associations between the container and the storage position, to facilitate later identification and retrieval of the container and/or one or more items carried therein. Further, a controller may instruct an agent to store the container at the determined storage position. The process 600 may then end, as at 616.

In this manner, containers that need environment control having desired environment attributes, as well as containers that do not need environment control, may be stored in various storage positions of a storage system or array using substantially the same processes and with similar automated equipment. Because insulated containers that need environment control may include features, lines, valves, or other characteristics to couple to an environment control distribution network, such insulated containers may be provided with environment control having desired environment attributes. Conversely, because non-insulated containers that do not need environment control may not include features, lines, valves, or other characteristics to couple to an environment control distribution network, such non-insulated containers may be stored at various storage positions without affecting or connecting to the environment control distribution network. Moreover, various types of automated agents may move or transfer both insulated and non-insulated containers using substantially similar processes, and the automated agents may operate in substantially ambient temperatures, and/or without crossing or traversing different environment conditions, because the environment control distribution network may be a substantially closed system including sources, distribution lines, storage positions, and containers.

Figure 7:
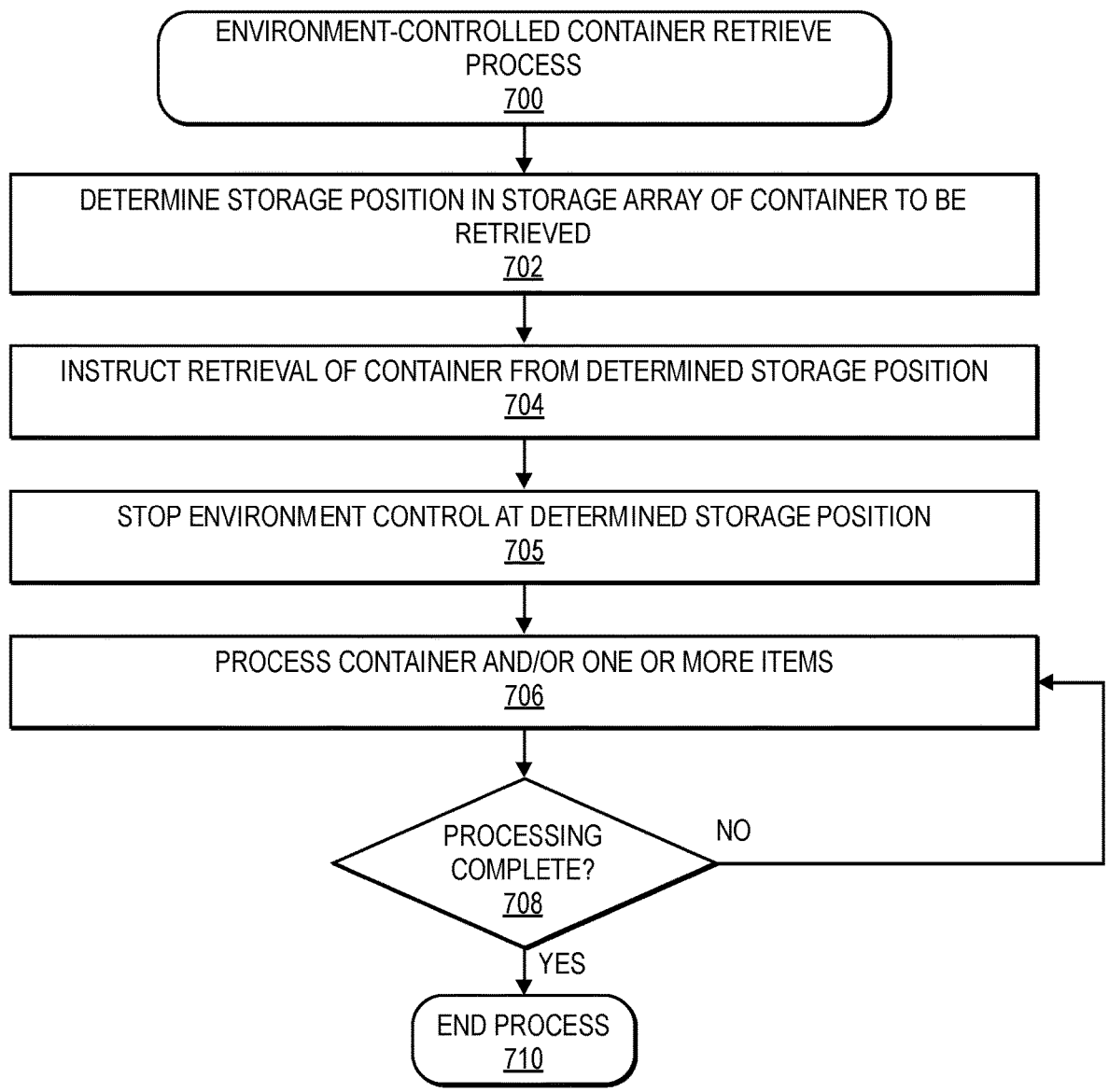
FIG. 7 is a flow diagram illustrating an example environment-controlled container retrieve process, in accordance with implementations of the present disclosure.

FIG. 7 is a flow diagram illustrating an example environment-controlled container retrieve process 700, in accordance with implementations of the present disclosure.

The process 700 may begin by determining a storage position in a storage array of a container to be retrieved, as at 702. For example, based on a request or instruction to retrieve a container and/or one or more items carried by a container, a storage position of the container may be determined based on stored data or information of associations between storage positions and containers and/or one or more items carried therein. In some example embodiments, a requested item may be carried by multiple containers, and one of the multiple containers having the requested item may be selected for retrieval based on various factors, e.g., storage position, time for retrieval, other items carried by the container, and/or various other factors. Further, a controller may determine a storage position of a container to be retrieved.

The process 700 may then continue by instructing retrieval of the container from the determined storage position, as at 704. For example, one or more agents, such as shuttles, robotic drive units, robotic arms, other robotic or automated equipment or machines, and/or human agents or associates, may remove or retrieve the container from the determined storage position in the storage system or array. Further, a controller may instruct an agent to retrieve the container from the determined storage position.

As described herein, if the container was coupled to the environment control distribution network, upon removing the container from the storage position, an input line and input valve of the container may automatically disconnect or decouple from a supply line and supply valve of the distribution network, in order to prevent air flow and minimize thermal losses from the supply line and the input line of the container. In addition, if the container was coupled to the environment control distribution network, an output line and output valve of the container may also automatically disconnect or decouple from a return line and return valve of the distribution network, in order to prevent air flow and minimize thermal losses from the return line and the output line of the container. The input, output, supply, and/or return valves may comprise passive, spring-loaded, one-way, shut-off valves that are in normally closed positions to prevent air flow. In other example embodiments in which the container was not coupled to the environment control distribution network, upon removing the container from the storage position, any supply lines and supply valves, and/or return lines and return valves, associated with the storage position may remain in normally closed positions to prevent air flow and minimize thermal energy losses associated with the distribution network.

The process 700 may further continue with stopping environment control at the determined storage position, as at 705. For example, portions of the distribution network may be actuated or modified to stop or pause the provision of air flow having the desired environment attributes to the determined storage position, substantially as described herein with respect to FIG. 5. In addition, because the input and supply valves may automatically disconnect and move to closed positions upon removal of the container from the storage position, air flow communication may be prevented between the supply line and an interior of the container. Moreover, because the output and return valves may also automatically disconnect and move to closed positions upon removal of the container from the storage position, air flow communication may be prevented between the interior of the container and the return line. In other example embodiments, the environment control at the determined storage position may instead continue to be provided, and the automatic disconnection and closing of one or more valves at the determined storage position may prevent air flow and minimize thermal energy losses in the absence of a coupled or connected container. Further, a controller may instruct a distribution network to stop environment control having desired environment attributes at the storage position.

The process 700 may then proceed by processing the container and/or one or more items, as at 706. For example, the container may be transferred to a processing station by various systems, devices, or methods, and the container and/or one or more items carried therein may be processed. The processing may include picking or removal of one or more items from the container, stowing or placement of one or more items into the container, transfer of items between multiple containers, inventory checking or verification of items in the container, maintenance or replacement of containers, and/or various other tasks or processes. Further, a control system may instruct processing of the container and/or one or more items.

The process 700 may then continue to determine whether the processing is complete, as at 708. For example, it may be determined whether the tasks or operations associated with the container and/or one or more items is complete. Further, a control system may determine whether the processing is complete.

If it is determined that the processing is not complete, the process may return to step 706 to continue processing of the container and/or one or more items. If, however, it is determined that the processing is complete, the process may then end, as at 710. Moreover, various additional processes may be performed on a container that has been retrieved from the storage system or array, including stowing the container back in the storage system or array as described herein at least with respect to FIG. 6. Various other downstream processes may also be possible for retrieved containers, including transfer to other stations or processes, shipping or transfer to customers or other facilities, removal of the containers from the materials handling network, and/or various other processes.

In this manner, regardless of whether containers are or are not coupled to environment control distribution networks to provide desired environment attributes, containers may be retrieved from various storage positions of a storage system or array using substantially the same processes and with similar automated equipment. For insulated containers that need environment control and include features, lines, valves, or other characteristics to couple to an environment control distribution network, such insulated containers may be disconnected or decoupled from the environment control distribution network upon retrieval. Similarly, for non-insulated containers that do not need environment control and may not include features, lines, valves, or other characteristics to couple to an environment control distribution network, such non-insulated containers may be removed from various storage positions without affecting or connecting to the environment control distribution network. Moreover, various types of automated agents may move or transfer both insulated and non-insulated containers using substantially similar processes, and the automated agents may operate in substantially ambient temperatures, and/or without crossing or traversing different environment conditions, because the environment control distribution network may be a substantially closed system including sources, distribution lines, storage positions, and containers.

Figure 8:
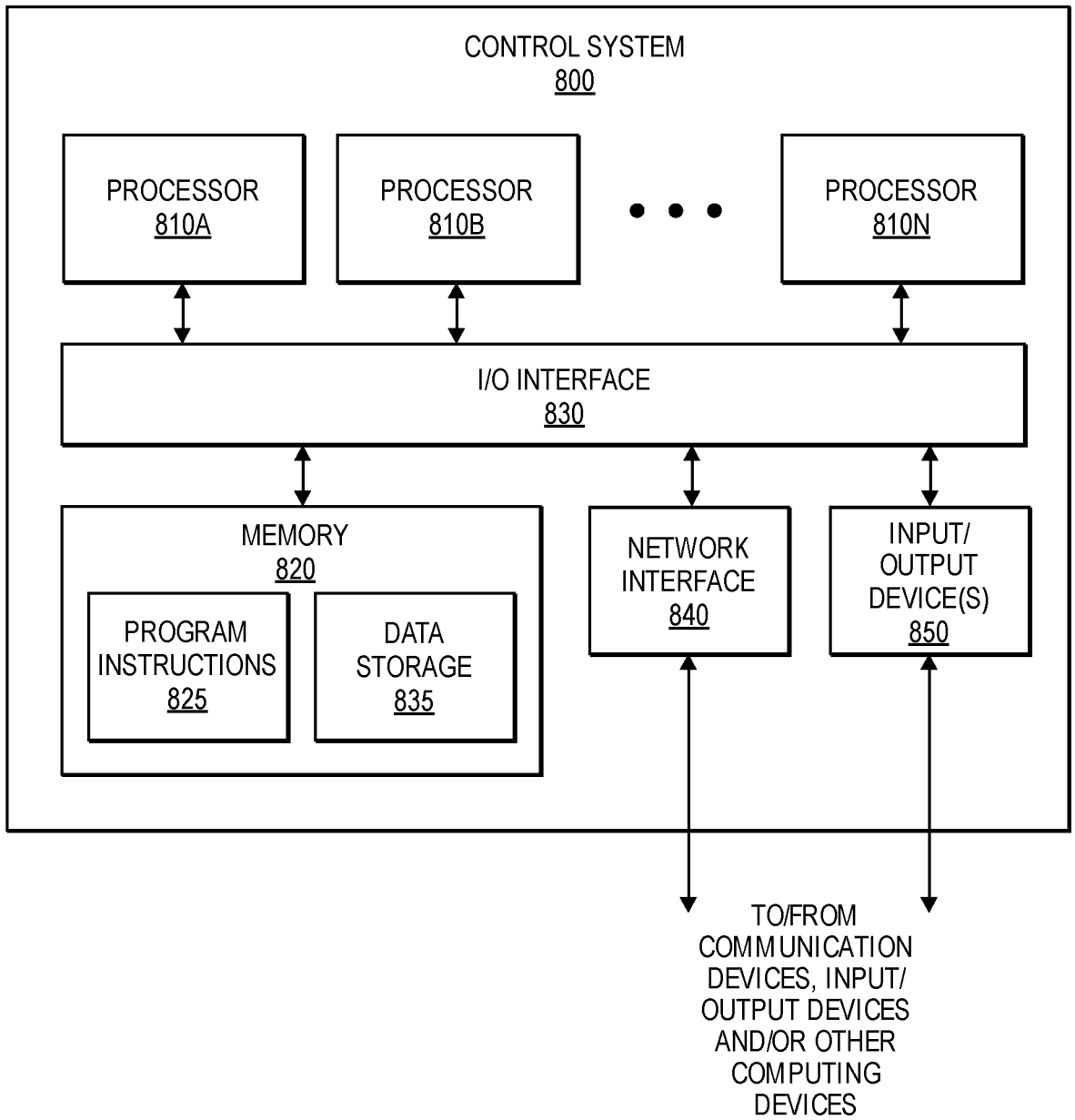
FIG. 8 is a block diagram illustrating various components of an example control system, in accordance with implementations of the present disclosure.

FIG. 8 is a block diagram illustrating various components of an example control system 800, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 8. In the illustrated implementation, a control system 800 includes one or more processors 810A, 810B through 810N, coupled to a non-transitory computer-readable storage medium 820 via an input/output (I/O) interface 830. The control system 800 further includes a network interface 840 coupled to the I/O interface 830, and one or more input/output devices 850. In some implementations, it is contemplated that a described implementation may be implemented using a single instance of the control system 800 while, in other implementations, multiple such systems or multiple nodes making up the control system 800 may be configured to host different portions or instances of the described implementations. For example, in one implementation, some data sources or services (e.g., related to portions of container-based environment control systems, operations, or processes, etc.) may be implemented via one or more nodes of the control system 800 that are distinct from those nodes implementing other data sources or services (e.g., related to other portions of container-based environment control systems, operations, or processes, etc.).

In various implementations, the control system 800 may be a uniprocessor system including one processor 810A, or a multiprocessor system including several processors 810A-810N (e.g., two, four, eight, or another suitable number). The processors 810A-810N may be any suitable processor capable of executing instructions. For example, in various implementations, the processors 810A-810N may be general-purpose or embedded processors implementing any of a variety of instruction set architectures (ISAs), such as the x86, PowerPC, SPARC, or MIPS ISAs, or any other suitable ISA. In multiprocessor systems, each of the processors 810A-810N may commonly, but not necessarily, implement the same ISA.

The non-transitory computer-readable storage medium 820 may be configured to store executable instructions and/or data accessible by the one or more processors 810A-

810N. In various implementations, the non-transitory computer-readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 820 as program instructions 825 and data storage 835, respectively. In other implementations, program instructions and/or data may be received, sent or stored upon different types of computer-accessible media, such as non-transitory media, or on similar media separate from the non-transitory computer-readable storage medium 820 or the control system 800. Generally speaking, a non-transitory, computer-readable storage medium may include storage media or memory media such as magnetic or optical media, e.g., disk or CD/DVD-ROM, coupled to the control system 800 via the I/O interface 830. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 840.

In one implementation, the I/O interface 830 may be configured to coordinate I/O traffic between the processors 810A-810N, the non-transitory computer-readable storage medium 820, and any peripheral devices, including the network interface 840 or other peripheral interfaces, such as input/output devices 850. In some implementations, the I/O interface 830 may perform any necessary protocol, timing or other data transformations to convert data signals from one component (e.g., non-transitory computer-readable storage medium 820) into a format suitable for use by another component (e.g., processors 810A-810N). In some implementations, the I/O interface 830 may include support for devices attached through various types of peripheral buses, such as a variant of the Peripheral Component Interconnect (PCI) bus standard or the Universal Serial Bus (USB) standard, for example. In some implementations, the function of the I/O interface 830 may be split into two or more separate components, such as a north bridge and a south bridge, for example. Also, in some implementations, some or all of the functionality of the I/O interface 830, such as an interface to the non-transitory computer-readable storage medium 820, may be incorporated directly into the processors 810A-810N.

The network interface 840 may be configured to allow data to be exchanged between the control system 800 and other devices attached to a network, such as other control systems, material handling system controllers, automated storage and retrieval system (ASRS) controllers, container- or tote-based automated storage and retrieval system (ASRS) controllers, warehouse management systems, other computer systems, various components or portions of the distribution network, automated agents, various types of sensors, various types of vision systems, imaging devices, or imaging sensors, upstream stations or processes, downstream stations or processes, other material handling systems or equipment, or between nodes of the control system 800. In various implementations, the network interface 840 may support communication via wired or wireless general data networks, such as any suitable type of Ethernet network.

Input/output devices 850 may, in some implementations, include one or more displays, monitors, projection devices, touchscreens, other visual input/output devices, microphones, speakers, other audio input/output devices, keyboards, keypads, touchpads, scanning devices, imaging devices, various types of sensors described herein, photo eyes, proximity sensors, RFID readers, voice or optical recognition devices, or any other devices suitable for entering or retrieving data by one or more control systems 800. Multiple input/output devices 850 may be present in the control system 800 or may be distributed on various nodes of the control system 800. In some implementations, similar input/output devices may be separate from the control system 800 and may interact with one or more nodes of the control system 800 through a wired or wireless connection, such as over the network interface 840.

As shown in FIG. 8, the memory 820 may include program instructions 825 that may be configured to implement one or more of the described implementations and/or provide data storage 835, which may comprise various tables, data stores and/or other data structures accessible by the program instructions 825. The program instructions 825 may include various executable instructions, programs, or applications to facilitate container-based environment control operations and processes described herein, such as ASRS controllers, drivers, or applications, automated agent controllers, drivers, or applications, distribution network source, valve, bleeder valve, or actuator controllers, drivers, or applications, sensor controllers, drivers, or applications, sensor data processing applications, vision system or imaging device controllers, drivers, or applications, imaging data processing applications, material handling equipment controllers, drivers, or applications, upstream station controllers, drivers, or applications, downstream station controllers, drivers, or applications, etc. The data storage 835 may include various data stores for maintaining data related to systems, operations, or processes described herein, such as storage systems or arrays, storage positions, distribution network sources, lines, valves, bleeder valves, actuators, sensors, or other components, containers, items, shuttles, robotic drive units, robotic arms, or other robotic or automated machines or equipment, various types of sensors, sensor data, various types of vision systems, imaging devices, or imaging sensors, imaging data, upstream stations or processes, downstream stations or processes, other material handling systems or equipment, etc.

Those skilled in the art will appreciate that the control system 800 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 800 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A storage system to provide tote-based temperature control, comprising:
   a storage array configured to receive a plurality of totes, the storage array including a plurality of storage positions, individual storage positions configured to receive individual totes, and the individual totes configured to receive at least one item;
   an air distribution network configured to provide temperature control to the individual storage positions of the storage array, the air distribution network including a plurality of pipes and a plurality of valves, and the individual storage positions of the storage array including a cold air supply pipe, associated cold air supply valve, a cold air return pipe, and associated cold air return valve;
   a plurality of sensors associated with the air distribution network, the plurality of sensors comprising a first pressure sensor at a first location and a second pressure sensor at a second location, the first and second pressure sensors configured to detect a pressure gradient between the first and second locations; and
   a plurality of insulated totes of the plurality of totes configured to be stored at the individual storage positions of the storage array, individual insulated totes including an input pipe, associated input valve, an output pipe, and associated output valve;
   wherein for individual insulated totes positioned at respective individual storage positions, the input pipe couples to the cold air supply pipe, the input valve and the cold air supply valve couple and open to allow air flow into an individual insulated tote, the output pipe couples to the cold air return pipe, and the output valve and the cold air return valve couple and open to allow air flow out of the individual insulated tote.

2. The storage system of claim 1, wherein the storage array comprises at least one of a multi-shuttle automated storage and retrieval system, or a tote-based automated storage and retrieval system.

3. The storage system of claim 1, wherein at least some of the plurality of sensors are configured to detect temperatures at respective portions of the air distribution network.

4. The storage system of claim 1, wherein for individual insulated totes positioned at respective individual storage positions, the input valve and the cold air supply valve comprise a cold air input double shut-off disconnect valve, and the output valve and the cold air return valve comprise a cold air output double shut-off disconnect valve.

5. The storage system of claim 1, further comprising:
a plurality of non-insulated totes of the plurality of totes configured to be stored at the individual storage positions of the storage array, individual non-insulated totes not including an input pipe, associated input valve, an output pipe, and associated output valve;
wherein for individual non-insulated totes positioned at respective individual storage positions, the cold air supply pipe and the cold air return pipe are not connected to an individual non-insulated tote, and the cold air supply valve and the cold air return valve are closed to prevent air flow.

6. A system, comprising:
a distribution network configured to provide environment control to individual storage positions of a storage array, the individual storage positions of the storage array comprising a supply line and associated supply valve;
a plurality of sensors configured to detect environment attributes at respective portions of the distribution network, the plurality of sensors comprising a first pressure sensor at a first location and a second pressure sensor at a second location, the first and second pressure sensors configured to detect a pressure gradient between the first and second locations; and
at least one container configured to be positioned at an individual storage position of the storage array, the at least one container comprising an input line and associated input valve;
wherein the supply line is configured to couple with the input line, and the supply valve and the input valve are configured to open to enable environment control of an interior of the at least one container.

7. The system of claim 6, wherein the distribution network is configured to provide at least one of temperature control, humidity control, pressure control, or air flow rate control from at least one source.

8. The system of claim 6, wherein the distribution network further comprises a plurality of sources having different respective environment attributes;
wherein the distribution network further comprises a plurality of distribution lines and a plurality of valves; and
wherein the supply line is connected to at least one of the plurality of sources via a respective distribution line and a respective valve.

9. The system of claim 8, wherein at least one of the plurality of distribution lines further comprises a bleeder valve configured to open to modify environment attributes relative to a respective source.

10. The system of claim 6, wherein the plurality of sensors include at least one of temperature sensors, humidity sensors, pressure sensors, or air flow rate sensors.

11. The system of claim 6, wherein the at least one container further comprises at least one sensor configured to detect environment attributes within the interior of the at least one container.

12. The system of claim 6, wherein the supply valve and the input valve comprise a passive, spring-loaded, double shut-off disconnect valve.

13. The system of claim 12, wherein the individual storage positions of the storage array further comprise a return line and associated return valve;
wherein the at least one container further comprises an output line and associated output valve;
wherein the return line is configured to couple with the output line, and the return valve and the output valve are configured to open to enable environment control of the interior of the at least one container; and
wherein the return valve and the output valve comprise a passive, spring-loaded, double shut-off disconnect valve.

14. The system of claim 6, further comprising:
at least one agent configured to position the at least one container at the individual storage position of the storage array;
wherein the at least one agent comprises at least one of an automated shuttle, a robotic drive unit, or a robotic arm and associated end effector.

15. The system of claim 6, further comprising:
a controller configured to control environment attributes associated with the distribution network via control of at least one of a source or a valve.

16. A method, comprising:
modifying, by a controller, at least one environment attribute associated with a distribution network, the distribution network configured to provide environment control to a plurality of storage positions of a storage array;
instructing, by the controller, an automated agent to position a container at a storage position of the storage array, the container comprising an input line and associated input valve, and the storage position comprising a supply line and associated supply valve; and
receiving, by the controller, data captured by at least one sensor associated with at least one of the distribution network or the container, the at least one sensor comprising a first pressure sensor at a first location and a second pressure sensor at a second location, the first and second pressure sensors configured to detect a pressure gradient between the first and second locations;
wherein responsive to positioning of the container at the storage position by the automated agent, the supply line couples with the input line, and the supply valve and the input valve open to enable environment control of an interior of the container.

17. The method of claim 16, wherein modifying the at least one environment attribute associated with the distribution network further comprises:
controlling, by the controller, at least one of a source or a valve associated with the distribution network.

18. The method of claim 16,
wherein the at least one environment attribute associated with the distribution network is modified based on the data captured by the at least one sensor.

19. The method of claim 16, further comprising:
instructing, by the controller, the automated agent to remove the container from the storage position of the storage array;
wherein responsive to removal of the container from the storage position by the automated agent, the supply line decouples from the input line, and the supply valve and the input valve close to prevent air flow.

20. The system of claim 6, wherein the pressure gradient is related to a number of containers that are coupled to the distribution network between the first and second locations.

* * * * *